Patented Aug. 19, 1952

2,607,801

UNITED STATES PATENT OFFICE 2,607,801

PREPARATION OF SALTS OF BENZENE SULFONIC ACID

David William Milner and Ernest Clifford Holdsworth, Cleckheaton, England, assignors to The Vulcan Chemical Company Limited, Cleckheaton, England No Drawing. Application January 30, 1950, Serial No. 141,355. In Great Britain January 3, 1949

2 Claims. (Cl. 260—505)

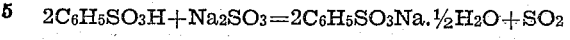

This invention relates to the preparation of the salts of sulphonic acids of aromatic and heterocyclic or substituted aromatic and heterocyclic nuclei.

The customary method of making the salt of a sulphonic acid is to mix an aqueous solution of the acid with the base or a salt decomposable by the acid, either in solid form or in the form of an aqueous solution. When a sulphite or the carbonate is the salt used, sulphur dioxide or carbon dioxide is removed by boiling the solution of the sulphonic acid salt and this solution is evaporated to dryness.

The preparation of sodium benzene sulphonate is a typical example and in this case sodium sulphite or carbonate is usually added to the hot aqueous solution of benzene sulphonic acid. Sodium sulphate has also been suggested as a neutralising agent but owing to the solubility of sodium benzene sulphonate it is not easy to separate it from the dilute sulphuric acid formed.

Many sulphonic acids of aromatic and heterocyclic and substituted aromatic and heterocyclic nuclei are soluble to a greater or less degree in liquid sulphur dioxide, and we have found that when the compound that is being used for the neutralisation is agitated with the solution of the sulphonic acid, the formation of the salt of the sulphonic acid takes place rapidly, smoothly and quantitatively.

The invention therefore consists in the process of producing salts of sulphonic acids of aromatic and heterocyclic nuclei or substituted aromatic and heterocyclic nuclei by the neutralisation in the presence of liquid dioxide sulphur, of the acid with a salt adapted to react therewith.

The invention more particularly consists in the process of neutralizing benzene sulphonic acid.

Conveniently, in accordance with the invention, the salt used for neutralising the acid is the sulphite, hydrogen sulphite, pyrosulphite, sulphate, pyrosulphate, halide, carbonate, hydroxide, acetate or the like of an alkali metal or an alkaline earth metal or of ammonium. Hydrates of the anhydrous salts may also be used.

Thus, the salt used for neutralising may be sodium sulphite.

The invention may be described in detail with reference to the preparation of the sodium salt of benzene sulphonic acid.

If a solution of benzene sulphonic acid in liquid sulphur dioxide is agitated with the stoichiometric amount of sodium sulphite, the neutralisation of the sulphonic acid is effected, the reaction products being sodium benzene sulphonate containing water of crystallisation, and sulphur dioxide. The following equation represents the reaction:

$$2C_6H_5SO_3H + Na_2SO_3 = 2C_6H_5SO_3Na \cdot \tfrac{1}{2}H_2O + SO_2$$

The sodium benzene sulphonate may be isolated by evaporating, filtering off, or decanting the liquid sulphur dioxide. The sulphur dioxide produced by the reaction adds to the bulk of the solvent and may be removed if desired from time to time.

The temperature range in which neutralisation may be carried out can be varied between wide limits but a convenient range is $-25$ to $+25°$. The upper limit of temperature at which sulphur dioxide can be employed as a liquid solvent is fixed by its critical temperature, which is $157.2°$ C. for pure sulphur dioxide. The lower limit at which sulphur dioxide ceases to be liquid is $-72.7°$ C. At temperatures above the normal boiling point of liquid sulphur dioxide, it is necessary to maintain sufficient pressure to keep the volume of the liquid substantially unchanged. If sodium carbonate is the neutralising agent, the carbon dioxide can be removed from time to time in order to prevent an accumulation of uncondensable gas.

Sodium benzene sulphonate crystallises with one molecular equivalent of water of crystallisation and consequently the product is free from excess moisture. Sodium benzene sulphonate is almost entirely insoluble in liquid sulphur dioxide.

The method of neutralisation that has been described is especially suitable when the initial sulphonation has been performed in liquid sulphur dioxide, for in this case the sulphonic acid can be immediately and directly converted into the salt without isolation.

The agent reacting with the sulphonic acid to form a salt thereof, may, for instance, be the sulphite, sulphate, halide, carbonate, hydroxide, acetate and the like of a metal such as sodium, potassium or calcium, or of a radical such as ammonium. If sodium sulphate is used, then the sulphuric acid may be removed by filtering or decanting off the liquid sulphur dioxide in which the sulphuric acid is soluble to a limited extent. The sulphuric acid in the filtrate of liquid sulphur dioxide can then be recovered by evaporating the sulphur dioxide or it may be converted in situ into a sulphate by mixing with a sulphite such as calcium sulphite whereby calcium sulphate and sulphur dioxide are formed.

Similarly, if sodium chloride is used to neutralise the sulphonic acid, then the hydrochloric acid that is liberated by the double decomposition, dissolves in the liquid sulphur dioxide. In the absence of extraneous water the hydrochloric acid is present in an anhydrous condition and may be separated from the liquid sulphur dioxide by appropriate means, or it may be neutralised in situ with a sulphite such as calcium sulphite or the dihydrate of the latter, thus making sulphur dioxide and calcium chloride or hydrated calcium chloride.

The simple salts of alkali metals and ammonium have been given as the usual neutralising agents, but the less common related salts can also be employed. Thus, sodium pyrosulphite $Na_2S_2O_5$ can be used in place of the normal sulphite and sodium pyrosulphate instead of the normal sulphate.

It is advantageous to neutralise in the absence of excess moisture contained either in the sulphonic acid or in the neutralising salt, since the resulting sulphonate is then easily filterable and the ultimate product is in a free flowing powdery state after all the liquid sulphur dioxide has been removed.

However, the presence of more water than is formed chemically does not affect the neutralisation and aqueous solutions of the neutralising salt can also be used.

The proportion of solvent to reactants is preferably so chosen that the resultant sulphonate is dispersed in sufficient liquid sulphur dioxide to make the mixture mobile and easy to agitate. A weight ratio of from 5 to 10 of liquid sulphur dioxide to one part of sulphonate is a convenient figure.

The time for the neutralisation is less than one hour under conditions of good agitation.

*Example I*

158 parts by weight of benzene sulphonic acid were dissolved in 1500 parts by weight of liquid sulphur dioxide at +18° C. in an autoclave fitted with a stirrer under an absolute pressure of 45 lbs./sq. inch and 63 parts by weight of dry powdered sodium sulphite was added and the whole stirred for one hour. The bulk of the liquid sulphur dioxide was decanted off and the rest removed from the sodium benzene sulphonate by reducing the pressure. The sodium benzene sulphonate weighed 189 parts and was a powder which, when completely dried, weighed 180 parts. A total of 1532 parts of sulphur dioxide were recovered.

*Example II*

238 parts by weight of benzene disulphonic acid were agitated with 2,100 parts by weight of liquid sulphur dioxide in an autoclave fitted with a stirrer. The temperature of the sulphur dioxide was +18° C. 126 parts of anhydrous sodium sulphite were added and the mixture was vigorously agitated for one hour. The main bulk of the liquid sulphur dioxide was removed by filtration and the last traces of sulphur dioxide were removed from the sodium benzene disulphonate by blowing warm air through the salt. After drying completely the sodium benzene disulphonate weighed 282 parts. 2,164 parts of sulphur dioxide were recovered.

We claim:

1. The process for producing a dry free flowing neutral salt of benzene sulfonic acids comprising dissolving the benzene sulfonic acid in liquid sulfur dioxide and then adding to said sulfur dioxide solution a dry neutralizing salt selected from the group consisting of a sulfite, acid sulfite, sulfate, pyrosulfate, halide, acetate, carbonate and hydroxide of alkali forming metals and ammonia in quantity sufficient to convert the dissolved sulfonic acid to an insoluble neutral salt thereof, filtering the insoluble neutral benzene sulfonic salt from the liquid sulfur dioxide, and evaporating the residual sulfur dioxide therefrom to produce the dry neutral hydrated sulfonate salt.

2. The method as defined in claim 1, wherein the sulfonic acid is benzene mono sulfonic acid and the neutral salt thereof is produced by neutralization thereof with a sulfite of an alkali forming metal.

DAVID WILLIAM MILNER.
ERNEST CLIFFORD HOLDSWORTH.

REFERENCES CITED

The following references are of record in the file of this patent:

UNITED STATES PATENTS

| Number | Name | Date |
|---|---|---|
| 2,007,510 | Thornton | July 9, 1935 |
| 2,244,512 | Brandt | June 3, 1941 |
| 2,325,320 | Holuba | July 27, 1943 |
| 2,358,774 | Blumer | Sept. 26, 1944 |
| 2,448,370 | Henderson | Aug. 31, 1948 |

OTHER REFERENCES

Jander: Naturwissenschaften, vol. 32 (1945), pp. 169–178.

Anderson: Australian J. of Science, vol. 5 (1943), pp. 184–188.

Wickert: Z Elektrochem., vol. 44 (1938), pp. 410–412.